Patented June 11, 1935

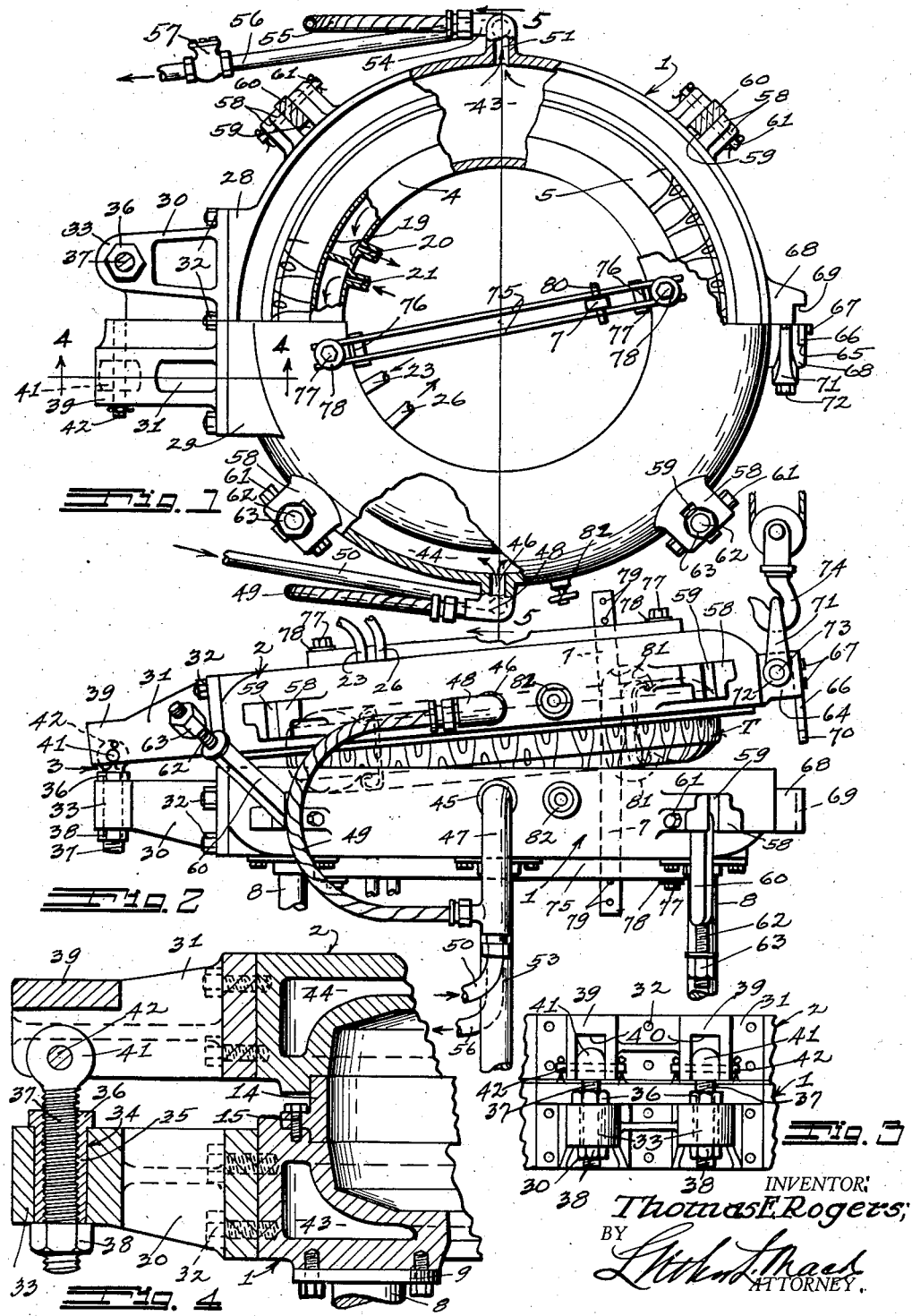

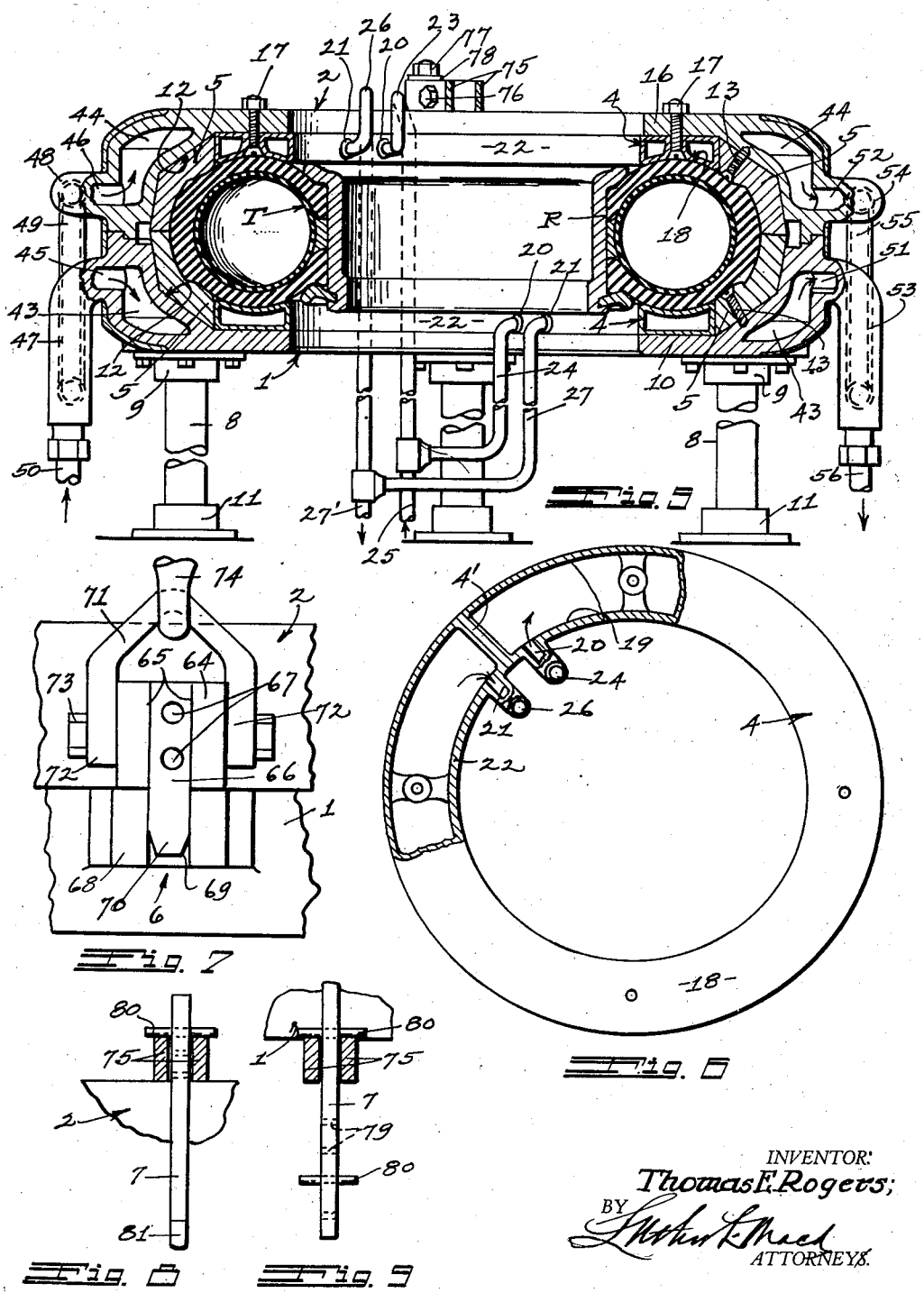

2,004,800

UNITED STATES PATENT OFFICE 2,004,800

TIRE RETREADING MOLD

Thomas E. Rogers, Los Angeles, Calif., assignor to Arch B. Cleveland and James E. Belden, jointly, both of Los Angeles, Calif.

Application June 26, 1933, Serial No. 677,631

1 Claim. (Cl. 18—18)

This invention relates to molds for retreading tires for motor vehicles, and a primary object is to provide a mold having incorporated therein cold plates thru which water may be circulated in a molding operation for use in connection with the matrices, whereby when the tread is being applied to the mold under heat the side walls of the tire casing will not be subjected to the heat of the mold and the resultant breaking down or injury thereto.

Another object is to provide a tire retreading mold formed with a pair of separable members and a hinge for connecting the mold members in such a manner that the axis of the hinge may be adjusted to correspond to the spacing of the two mold members so that at the completion of a retreading operation the mold may be more readily opened and one of the mold members moved away from the tire within the mold and the other mold member.

Another object is to provide means on the periphery of the two mold members whereby in a mold closing operation the movable member may be guided into exact alinement with the stationary member.

A further object includes the provision on the stationary and movable members of selectively operable ejecting devices for engagement with the tire or the rim on which the tire is mounted for optionally stripping the tire from the stationary or movable mold member as the mold is opened.

In the consideration of my invention it will be understood that in a tire retreading operation a tire is inflated on a rim and then inserted in a mold provided with matrices bearing the desired design of tread and heated by steam for the purpose of curing the tread on the tire. Such an operation, while effective for permanently applying a tread to a used tire, has the disadvantage in ordinary types of molds of impairing the appearance of the side walls of the tire inwardly of the tread where no additional rubber is applied. Thus a treading operation frequently results in the blurring or removal of marks, names, numbers, etc., usually embossed on the side walls of a tire, whereas by the provision of my improved cold plate thru which water is circulated during a treading operation the side walls of the tire are maintained at a relatively low temperature as compared to the necessary temperature for curing the rubber of the tread, and injury to the side walls is prevented.

A mold for the purpose of retreading tires is usually composed of stationary and movable members of similar cross section split on a median line and hinged together at points on the periphery of the mold halves. Usually such hinges are fixed, and due to this fact separate molds are required for tires of different cross sectional area but of substantially similar diameter. In my improved mold I have provided an adjustable hinge whereby the movable mold member may be spaced from the stationary member by means of the interposition of a spacer for the purpose of accommodating the mold to tires of different cross sectional diameter and for the further purpose of adjusting the axis of the hinge to an extent sufficient to permit the ready opening of the mold and the movement of the movable member away from the tire in an opening operation.

I have shown a preferred form of my invention in the accompanying drawings, in which Fig. 1 is a plan view of a mold embodying my improvements, partly in section at different points to illustrate details of construction.

Fig. 2 is a side elevation thereof.

Fig. 3 is a rear elevation of the hinge connecting the stationary and movable mold members.

Fig. 4 is a fragmentary section of the mold on line 4, 4 of Fig. 1 showing details of the hinge structure.

Fig. 5 is a sectional elevation of the mold on line 5—5 of Fig. 1.

Fig. 6 is a sectional plan of a cold plate, one of which is adapted to be used in each section of the mold.

Fig. 7 is a fragmentary front elevation of the mold showing means on the two mold sections for guiding the movable section of the mold into accurate alinement with the stationary section in a mold closing operation.

Figs. 8 and 9 are, respectively, fragmentary elevations of ejecting devices of similar character mounted on the movable and stationary mold sections for engagement with a tire or a tire rim for stripping the mold from one of said sections as the mold is opened, as seen on line 5, 5 of Fig. 1.

Briefly described, my improved mold includes a stationary mold section 1, a movable mold section 2, an adjustable hinge device 3 for connecting said sections together, cold plates 4, 4 detachably held in the sections 1 and 2, matrices 5, 5 also detachably held in the sections 1 and 2 and carrying a design for the treads, a mold alining device 6 for guiding the movable mold section into accurate alinement with the stationary section, and ejectors 7, 7 carried by the mold sections 1 and 2, for the purpose hereinbefore described.

The two mold sections 1 and 2 of substantially similar design are of annular form and of similar cross section so that when the two sections are in closed position they will encompass a tire T, as shown in Fig. 5. The mold is slightly tilted laterally from a horizontal position for the purpose hereinafter described and is supported on a plurality of legs 8, 8 which carry flanges 9, 9 at their upper ends attached to the lower side 10 of the stationary mold section 1. Similar floor flanges 11, 11 are attached to the lower ends of the legs 8 and are adapted to rest upon the surface of a floor for supporting the mold in operative position at a suitable elevation.

The two halves 1 and 2 of the mold are correspondingly finished at 12, 12 for receiving the half sections 5, 5 of the tread matrices, and said matrices are secured to the mold sections by means of a plurality of screws 13, 13, as shown in Fig. 5, which are arranged at suitable points therearound. The matrix sections 5, 5 may be held with their adjacent faces in abutment, as shown in Fig. 5, or, as shown in Fig. 4, a spacer 14 may be interposed between the adjacent faces of the matrices and secured to the stationary mold section 1 by means of a plurality of screws 15.

Adjacent the inner edges of the matrices 5 I provide in each of the mold sections 1 and 2 a hollow cold plate 4 of annular form. The cold plate in the stationary mold section is loosely held on the side wall 10 of the mold section and a similar plate is correspondingly mounted in the movable section 2 against the side wall 16 thereof and is detachably held in position on said movable section by means of a pair or more of screws 17. (See Fig. 5.) Thus the cross sectional area of the matrices 5 is such as to encompass only the tread portion of a tire T while the inner faces of the opposite cold plates 4 engage the side walls of the tire inwardly of the tread.

To this end the inner walls 18 of the cold plates 4 are of concave cross section so as to conform to the curvature of the side walls of a tire T. The cold plates 4 are provided with a chamber 19 which has an inlet 20 and an outlet 21 in its inner wall 22, and a partition 4' is arranged between said inlet and said outlet, as shown in Fig. 6. The inlets 20, 20 of the two cold plates 4, 4 are connected by means of branch pipes 23 and 24 respectively with a water service pipe 25 leading from a source of supply. Similarly the outlets 21, 21 from the cold plates are connected by means of branch pipes 26 and 27 with a pipe 27' serving as a return to a source of supply or to a source of discharge, whereby water may be circulated continuously thru the chambers 19 of the cold plates during a retreading operation.

Necessarily the pipes 23 and 26 leading to the upper cold plate 4 in the section 2 are of flexible character so as to permit the opening and closing of the mold.

At corresponding points on the periphery of the mold sections 1 and 2, bosses 28 and 29 are formed respectively, to which are attached hinge brackets 30 and 31 by means of bolts 32, 32 etc. The bracket 30 on the member 1 is formed with a pair of laterally spaced bosses 33 arranged on opposite sides of a longitudinal center line cutting the axis of the mold. Said bosses have vertical bores 34 therein in which are held sleeves 35 provided on their upper ends with wrench receiving heads 36 of hexagonal or other suitable form.

The sleeves 35 are internally threaded to receive eye bolts 37 which are threaded thru and extend substantially below the sleeves and carry lock nuts 38 on their lower ends. The bracket 31 on the movable mold member 2 is formed with a pair of lugs 39, 39 which are spaced to correspond to the bosses 33 on brackets 30 and are recessed at 40, 40 to receive the eyes 41 forming the heads of the bolts 37. Hinge rods 42 are held in the lugs 39, 39 and extend thru the eyes 41, 41 of bolts 37, 37, respectively, for hingedly connecting the mold sections 1 and 2.

It is apparent that by applying a wrench to the portion 36 of sleeve 35 and loosening nut 38 the axis of the hinge may be adjusted relative to the upper face of mold section 1 to correspond to the width of or to accommodate the mold to the absence of the spacer 14. (See Figs. 4.) Preferably in a mold of this type the axis of the hinge 42 should be slightly above or at least substantially on a line with the upper edge of the spacer 14 so that the mold section 2 in an opening operation will tend to move away from the tread of the tire T at the close of a retreading operation rather than to frictionally engage the tire and retard the opening of the mold.

The mold sections 1 and 2 are provided with steam chambers 43 and 44 thru which steam from a boiler or source of supply may be circulated for the purpose of heating the molds in a tread curing operation. Said chambers have inlets 45 and 46, respectively, with elbows or short pipe sections 47 and 48 leading therefrom and connected by means of a flexible tube 49 as shown in Fig. 2. The elbow or pipe 47 leading from mold section 1 connects by means of a pipe 50 with a source of supply. Similarly the chambers 43 and 44 in the sections 1 and 2, respectively, are provided with outlets 51 and 52 with elbows 53 and 54 connected therewith and inter-connected by means of a flexible tube 55, while the elbow 53 is connected with a return steam pipe 56 leading back to the boiler.

Preferably, as shown in Fig. 5, the entire mold is tilted slightly to the right so that the products of condensation may be drained outwardly thru the member 53. A check valve 57 is interposed in the pipe 56 so that the steam pressure in the mold may be at all times balanced with the pressure in the boiler or at the source of supply. Said valve prevents the flow of steam to the mold thru the valve and pipe 56, but is capable of being operated when the pressure in the mold is in excess of that of the source of supply.

At a plurality of points on the periphery of the mold sections 1 and 2 I provide correspondingly formed and positioned lugs 58, 58 etc., with radially formed slots 59, 59 etc., from the axis of the mold. In the lugs 58 of mold member 1 I hingedly mount locking bars 60 on bolts 61 with ends of the bars disposed in the slots 59 of said lugs. Said bars have threaded extensions 62 on their opposite ends and carry nuts 63 threaded thereon. Thus, when the molds are closed the bars 60 may be swung upwardly from their positions shown in Fig. 2 so that the bodies of the bars will seat in the slots 59 of the lugs 58 on the movable mold section 2 and the nuts 63 may be tightened against the upper faces of the lugs 58 on said member 2 for locking the mold sections together. Preferably, the two rear locking bars 60, as shown in Fig. 2, are formed at their inner ends so as to retain them in inclined positions when they are detached from the mold member 2 and prevent them from dropping into the positions assumed by the two front locking members, as shown in Fig. 2. Said bars are so formed particularly to prevent interference with the flexible pipes 49 and 55 and to facilitate the opening and closing operations.

The front of the mold section 1 is provided with a lug 64 having a vertical groove 65 formed in its outer face in which is held a guide bar 66, as by means of screws 67. A corresponding groove 68 is formed on the mold member 1 in alinement with the lug 64 and is provided with a vertical groove 69 in alinement with the groove 65 for receiving the protruding lower end 70 of the guide bar 66 carried by the movable mold section. Preferably the end 70 of bar 66 is chamfered so that as the mold section 2 approaches mold closing position with respect to mold section 1 the chamfered end of the bar will first engage the edges of the groove 69 and guide the bar into said groove so that the two mold sections will be accurately alined with the matrices 5 in retreading position relative to the tire T.

The lug 64 on mold section 2 is preferably provided with a clevis 71 which has its opposite legs 72, 72 hingedly held on said lug by means of a bolt or screw 73 held in said lug. The clevis 71 is adapted to receive a hook 74 associated with a fall or a tackle by means of which the movable mold section 2 may be raised or lowered in mold opening and closing operations.

As hereinbefore stated, the ejectors 7 are effective for stripping the tire T from the mold in a mold opening operation so that a tire may be stripped from the stationary section 1 and retained in the movable section 2, or it may be retained in the section 1 and stripped from the movable section 2, as may be desired. To this end the two ejectors 7, 7 are similar in form but are reversely positioned on the mold.

Each of said ejectors 7 is loosely mounted on a pair of spaced bars 75, 75 which extend diametrically across the bottom of the stationary mold section 1 and the top of the movable section 2. In each case the ejector supporting bars are permanently spaced apart by means of suitable spacers 76, 76 near their ends and are secured at their extremities to the mold sections 1 and 2 by means of cap screws 77 and washers 78 interposed between the heads of the screws and the outer edges of the bars. The bars 75, 75 in each case are spaced apart so that the associated ejector 7 will be loosely held therebetween.

The ejectors 7, 7 are each provided with a plurality of perforations 79, 79 for selectively receiving a pin 80, said pin engaging the upper edges of the uppermost set of bars 75 and the lower edges of the lowermost set of bars so as to limit the downward and upward thrust, respectively, of the ejectors. The upper ejector is provided at its lower end and the lower ejector at its upper end with a hook 81 which is adapted to engage the edge of a metal rim 82 on which the tire T is mounted.

The perforations 79 in the ejector bars are spaced apart longitudinally of the bars so that the pins 80 therein may be adjusted for the purpose of engaging the hooks 81 with the upper or lower edge of the rim R for a given size of tire. Thus, as shown in Fig. 2, if it is desired to strip the tire T from the stationary mold section 1 and to retain it in the movable section 2, the uppermost ejector 7 is dropped downwardly so that the hook 81 thereon engages the lower edge of the rim R and the upward movement of the mold section 1 will strip the tire from the lower mold section.

On the other hand, if the tire is to be retained in the lower section of the mold the lowermost ejector 7 is engaged with the upper edge of rim R and the separation of the mold section 2 from the section 1 will strip the tire from the movable mold section.

The lowermost ejector 7 is inoperatively held on the bars 75, 75 by means of an additional pin 80 engaging the upper edges of the lowermost set of bars 75, as shown in Fig. 9.

Each of the mold sections 1 and 2 may be provided with a pressure relief cock 82 at a suitable point for relieving excess pressure therein.

The mold is operated as follows: A tire T properly inflated on a rim R is positioned centrally in the stationary mold member 1, together with the material for the tread to be applied and the matrices 5. The mold is then closed by gradually moving the movable member 2 downwardly in the direction of the stationary mold member. The alining bar 66 serves to accurately aline the two mold members in the closing operation, and a spacer 14 of desired width, corresponding usually to the width of a central rib on a tire tread, having been affixed to the stationary member 1 when the mold is closed, the tire T is closely held between and is completely embraced by the two mold members 1 and 2.

The cold plates 4, 4 engage corresponding sides of the tire, as shown in Fig. 5. Steam is circulated thru the chambers 43 and 44 of the two mold members, and water is circulated thru the two cold plates 4, 4, whereby the material of which the tread is formed and the tread receiving portion of the tire is heated to a proper temperature, while the side walls of the tire are kept cool by means of the cold water circulating thru the plates 4, 4.

The mold members 1 and 2 are held in closed position by means of the plurality of locking bars 60. When the spacer 14 is adjusted in the mold member 1 the axis 41 of the hinge 3 is elevated to a point substantially flush with or slightly above the upper edge of the spacer. Thus at the completion of a molding operation the locking bars 60 are detached from the mold member 2 and the movable member 2 may be quickly separated from the tire T and from the adjacent member 1.

The ejectors 7 are selectively adjusted for stripping the tire T from either of the members 1 or 2, as may be desired.

The advantages of my improvements will be appreciated by those skilled in the art of retreading tires.

What I claim is:

A tire mold comprising a pair of separable mold sections with a cavity therein for receiving a tire, and ejecting devices supported on opposite sides of said mold sections and extensible into the planes of the adjacent mold sections for engagement with a portion of a tire whereby when the mold is opened the tire will be retained in a selected one and stripped from the other mold section.

THOMAS E. ROGERS.